No. 839,822. PATENTED JAN. 1, 1907.
N. S. DUNNINGTON.
TENT STAKE.
APPLICATION FILED JUNE 14, 1906.
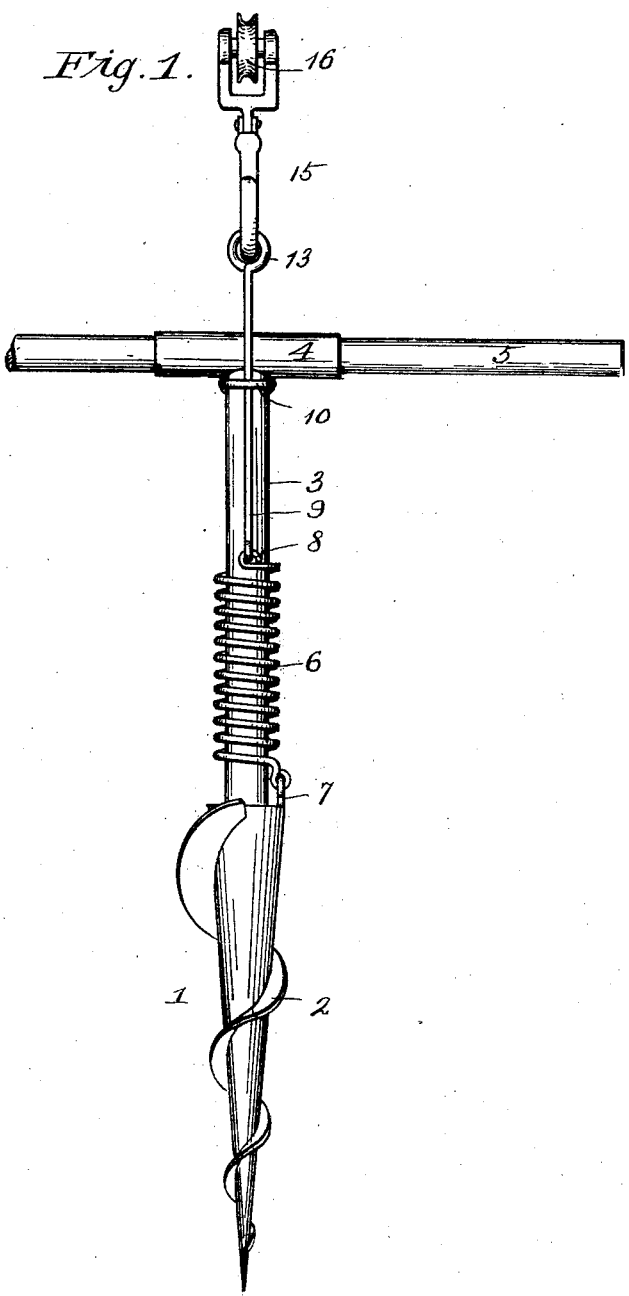
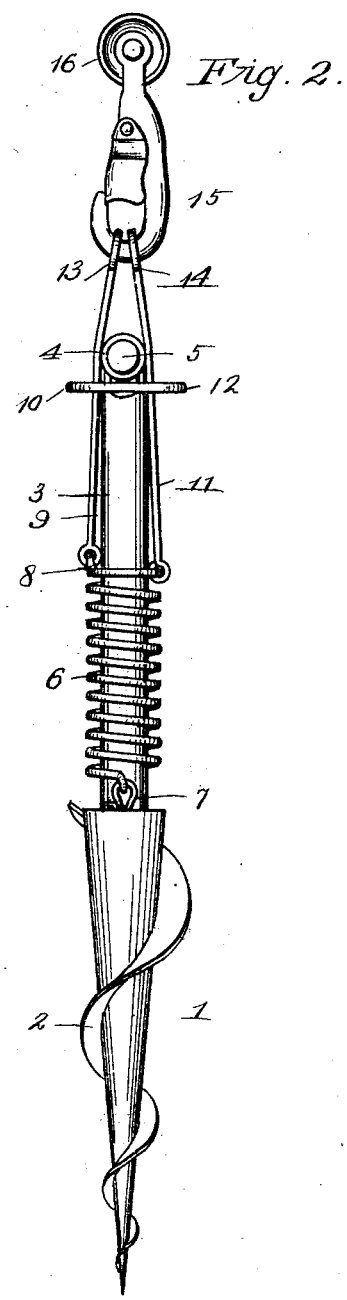
Witnesses:
R. E. Hamilton
J. Moore
Inventor,
N. S. Dunnington
By F. G. Fischer
Atty.

UNITED STATES PATENT OFFICE.

NATHAN S. DUNNINGTON, OF LEAVENWORTH, KANSAS.

TENT-STAKE.

No. 839,822.  Specification of Letters Patent.  Patented Jan. 1, 1907.

Application filed June 14, 1906. Serial No. 321,623.

*To all whom it may concern:*

Be it known that I, NATHAN S. DUNNINGTON, a citizen of the United States, residing at Leavenworth, in the county of Leavenworth and State of Kansas, have invented certain new and useful Improvements in Tent-Stakes, of which the following is a specification.

My invention relates to improvements in tent-stakes; and my object is to provide a device of this character that cannot be accidentally withdrawn from the ground and at the same time will yield sufficiently to permit the shrinkage of ropes and canvas during wet weather.

By employing my device all annoyance occasioned by the breakage of ropes, tearing of tents, and the shifting of tent-stakes is avoided, as my stakes will expand and contract with the ropes and canvas, and thus keep the same properly tensioned at all times.

In the accompanying sketch, Figure 1 represents a front elevation of the invention. Fig. 2 shows a side elevation thereof.

In carrying out the invention I employ an auger 1, provided with a thread 2, whereby it may be readily forced into the soil.

3 designates a stem extending upwardly from the auger and having a cross-head 4 for the reception of a handle 5, whereby the stake is turned in forcing the auger into the ground or withdrawing it therefrom.

6 designates a coil-spring secured at its lower end to an eye 7 on the auger and formed into a loop 8 at its upper end for the reception of a rod 9, extending through a guide 10 at the upper end of stem 3. 11 designates a rod engaging the opposite side of the spring and extending upwardly through a guide 12 on the stem. Rods 9 and 11 are formed into eyes 13 14, respectively, at their upper ends for the reception of a snap-hook 15, provided at its upper end with an antifriction grooved roller 16, around which one of the tent-ropes extends.

In rainy weather, when the canvas and ropes become wet and shrink, it is obvious that springs 5 will expand and permit them to shrink, and when the same become dry and begin to stretch the springs will contract and keep said ropes and canvas properly tensioned.

From the above description it is apparent that I have produced a device which is simple in construction, may be manufactured at reasonable cost, and is well adapted for the purpose intended.

Having thus described my invention, what I claim, and desire to secure by Letters Patent, is—

1. A tent-stake consisting of an auger, means for turning the same, and resilient means for connecting said stake to a cable.

2. A tent-stake consisting of an auger, a handle for turning the same, and resilient means for connecting said stake to a cable.

3. A tent-stake consisting of an auger, a stem extending upwardly therefrom, means for turning the same, and resilient means for connecting the stake to a cable or other object.

4. The combination of a tent-stake, a coil-spring embracing the same and attached thereto, rods secured to said spring, guides on the stake through which said rods extend, and a hook engaging the upper ends of the rods.

5. The combination of a stake, means carried thereby for forcing it into the ground, and resilient means for connecting said stake to any desired object.

6. The combination of a pointed stake adapted to be forced into the ground, and resilient means connected to said stake, for the purpose described.

In testimony whereof I affix my signature in the presence of two witnesses.

NATHAN S. DUNNINGTON.

Witnesses:
F. G. FISCHER,
J. MOORE.